United States Patent [19]

Grosse-Scharmann

[11] Patent Number: 4,520,874
[45] Date of Patent: Jun. 4, 1985

[54] AGRICULTURAL MACHINE

[75] Inventor: Franz Grosse-Scharmann, Hude, Fed. Rep. of Germany

[73] Assignee: Amazonen-Werke H. Dreyer, Hasbergen-Gaste, Fed. Rep. of Germany

[21] Appl. No.: 470,029

[22] Filed: Feb. 25, 1983

[30] Foreign Application Priority Data

Mar. 4, 1982 [DE] Fed. Rep. of Germany ....... 3207749

[51] Int. Cl.³ .............................................. A01B 33/06
[52] U.S. Cl. .................... 172/49.5; 172/125; 403/359; 403/383; 464/901
[58] Field of Search ............ 172/49.5, 117, 125, 172/59; 74/431, 433; 403/345, 359, 383; 464/1, 160, 182, 901

[56] References Cited

U.S. PATENT DOCUMENTS

| 2,634,991 | 4/1953 | Stevens | 403/383 |
| 4,043,402 | 8/1977 | Nelson | 172/125 X |
| 4,098,096 | 7/1978 | Chard et al. | 403/359 X |
| 4,111,264 | 9/1978 | van der Lely | 172/125 X |
| 4,115,022 | 9/1978 | Orain | 403/359 |
| 4,457,734 | 7/1984 | Cohen | 464/160 X |

FOREIGN PATENT DOCUMENTS

| 2538306 | 3/1976 | Fed. Rep. of Germany . | |
| 8114520 | 2/1982 | Fed. Rep. of Germany | 172/125 |
| 872549 | 7/1961 | United Kingdom | 403/359 |
| 2029184 | 3/1980 | United Kingdom | 172/49.5 |

Primary Examiner—Richard T. Stouffer
Attorney, Agent, or Firm—Sprung Horn Kramer & Woods

[57] ABSTRACT

An agricultural machine with a frame on which tool rotors are mounted on upright shafts in a row extending across the direction in which the machine travels. The rotors are driven by a horizontal driveshaft that is segmented and interlocked by couplings. Each segment of the driveshaft is a component of one of the angular gears that drive the tool rotors. The horizontal driveshaft is coupled, through a coupling device that is inside the housing of a main train mounted on the frame, with the output gearwheel of the main train and hence driven by it. Guides for aligning the central axis of the components of the driveshaft with the center line of the output gearwheel of the main train are positioned in a known way at least between the main train and the gears of a tool rotor that are immediately adjacent to it. The coupling device has a coupling component that is rigidly attached to the components of the driveshaft that extend into the main train. The coupling component has coupling elements that engage with a certain amount of play with other coupling elements in the output gearwheel inside its bearings.

5 Claims, 4 Drawing Figures

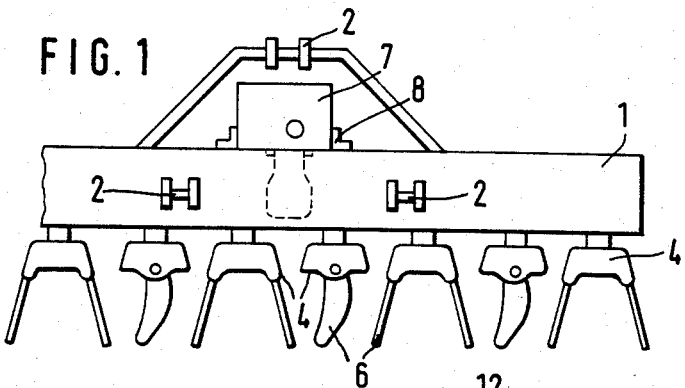
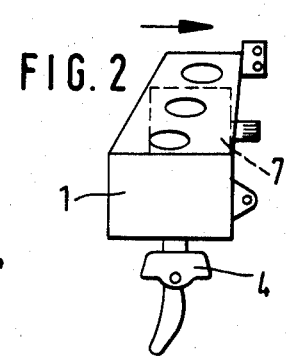
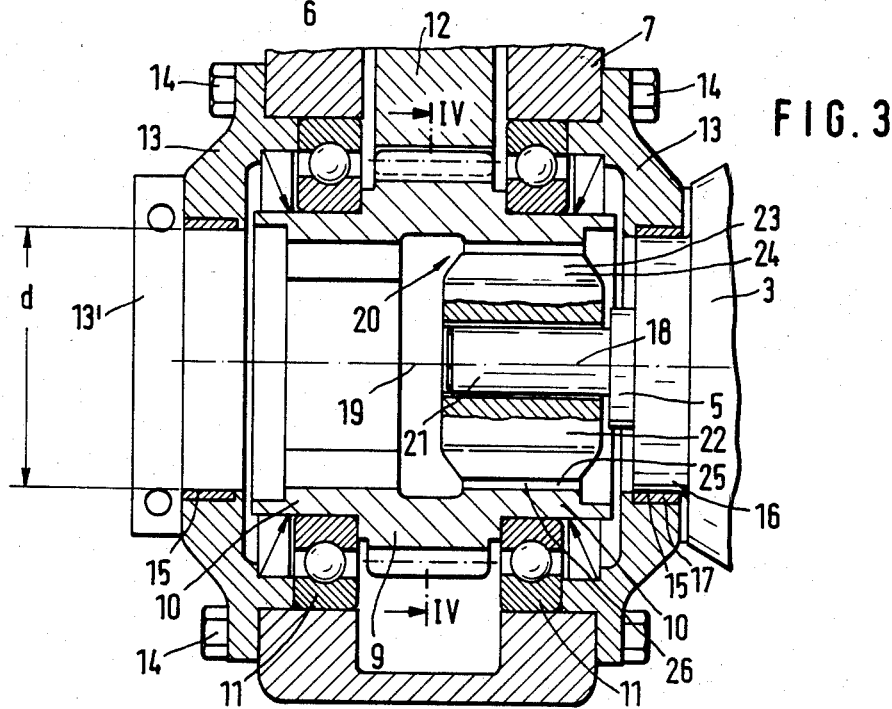
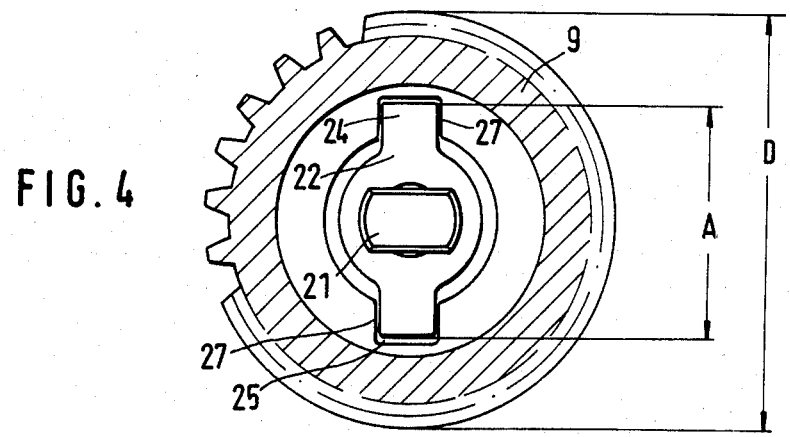

AGRICULTURAL MACHINE

BACKGROUND OF THE INVENTION

The present invention relates to an agricultural machine of the type having a frame on which tool rotors are mounted on upright shafts in a row extending across the direction in which the machine travels, with the rotors driven by a horizontal driveshaft that is segmented and interlocked by couplings, with each segment of the driveshaft a component of one of the angular gears that drive the tool rotors, and with the horizontal driveshaft coupled, through a coupling device that is inside the housing of a main train mounted on the frame, with the output gearwheel of the main train and hence driven by it.

An agricultural machine of this type is known from German Utility Model No. 8 114 520. The tool rotors of the machine are driven by angular gears with driveshafts that can be individually installed and that are coupled together. One end of the driveshaft of each angular gear, adjacent to the main train, is splined and fits into matching splines in the output gearwheel which drives it.

One advantage of this machine is that the couplings between the angular-gear driveshafts are designed so that the angular gears can be separatedly dismounted for repair, with only the gear that needs to be repaired having to be removed. It is also easy to dismount the main train by removing the two angular gears immediately adjacent to it.

However, there is also a disadvantage to the machine. The coupling device is subject to extremely high wear because the driveshafts of the angular gears adjacent to the main train are not aligned precisely enough in the coupling device of the main-train output gear. This leads to rapid breakdown of the coupling. This type of wear, which is also called fretting corrosion, will lead to especially rapid breakdown when powerful forces have to be transmitted and the coupling device is not airtight. Another agricultural machine with a frame on which tool rotors are mounted on upright shafts in a row extending across the direction in which the machine travels and are driven through individual angular gears by a main train is known from German OS No. 2 538 306. Between the main train and the rotor drive mechanisms immediately adjacent to it, this machine has guide elements for aligning the central axis of the driveshaft components with the center line of the main-train output gear.

One disadvantage of this second machine is that the gearwheels are connected to the continuous driveshaft in such a way that only very weak forces can be transmitted. Another disadvantage is that the multiple mounting and unavoidable manufacturing tolerances of the continuous driveshaft expose it to extremely powerful bending stresses in operation. Furthermore, the continuous driveshaft and all the gearwheels mounted on it must be dismounted when the drive mechanism has to be repaired or individual bearings or gearwheels replaced. Since almost the whole machine must be more or less disassembled to do this, it involves an excessive amount of labor.

SUMMARY OF THE INVENTION

The subject of the present invention is to provide an improvement in this type of machine that retains all its advantages and in which the main train drives the tool rotor simply, wear is low, and repairs will be infrequent.

This object is achieved in accordance with the present invention by guides for aligning the central axis of the components of the driveshaft with the center line of the output gearwheel of the main train which are positioned in a known way at least between the main train and the gears of a tool rotor that are immediately adjacent to it and wherein the coupling device has a coupling component that is rigidly attached to the components of the driveshaft that extend into the main train, the coupling component having coupling elements that engage with a certain amount of play other coupling elements in the output gearwheel inside its bearings. These measures ensure extremely simple and reliable tool-rotor drive even under the most difficult conditions. Machines that are already in use can also be subsequently refitted by replacing the output gearwheel and aligning it with the main train.

In a preferred embodiment, the coupling elements on the coupling component are cams that engage coupling elements on the output gearwheel that are channels. This is obviously a simple drive connection. The transmitting surfaces of the coupling elements are also probably hardened.

As a further feature, the distance between the outer faces of the two cams, which are symmetrical, is more than half the diameter of the output gearwheel. This almost completely prevents wear, even at unavoidable manufacturing tolerances.

As still a further feature, the distance between the outer faces of the two cams is shorter than the diameter of the mount for the guides.

The invention will now be specified with reference to the drawings, in which:

BRIEF DESCRIPTION OF THE DRAWINGS

FIG. 1 is a front view of an agricultural machine in accordance with the invention;

FIG. 2 is a side view of the agricultural machine;

FIG. 3 is a section through the coupling device, in accordance with the invention, inside the bottom half of the main train of the agricultural machine,. and FIG. 4 is a section through the output gearwheel along line IV—IV in FIG. 3.

DETAILED DESCRIPTION OF THE INVENTION

Referring to FIGS. 1–4, the agricultural machine is a rotary cultivator with a frame 1 that carries three-point coupling linkages 2 for attaching the cultivator to the three-point power lift of an agricultural tractor. Tool rotors 4, driven by separate angular gears 3, are mounted in frame 1. A horizontal driveshaft 5, which is segmented and interlocked by couplings, rotates each tool rotor 4 in a sense opposite that of its neighbor. The paths traced by each tool 6 overlaps. Each segment of driveshaft 5 is a component of an angular gear 3.

A main train 7 is mounted on frame 1, to which it is fastened with sections 8. The lower half of main train 7 extends into frame 1 and is provided with an output gearwheel 9 that is mounted in main train 7 by means of a lateral collar 10 that fits into a bearing 11. Output gearwheel 9 is driven through an intermediate wheel 12 and through a bevel drive, not illustrated, in main train 7 by the takeoff shaft of the tractor.

A train cover 13 is mounted on each side of and screwed tightly with screws 14 to main train 7. Main train 7 is additionally attached to frame 1 with brackets 13' on train covers 13. Each train cover 13 has a mount 15 that forms, in conjunction with a round extension 16 of angular gear 3, guides 17 for aligning the central axes 18 of the driveshaft 5 components with the center line 19 of the output gearwheel 9 of main train 7.

Inside the housing of main train 7 is a coupling device 20 driven by output gearwheel 9. Coupling device 20 has a coupling component 22 that is rigidly attached to components 21 of driveshaft 5 that extend into main train 7. Coupling component 22 has coupling elements 23 in the shape of cams 24 that engage with a certain amount of play other coupling elements 26 in the shape of channels 25 in output gearwheel 9 inside bearing 11 of gearwheel 9 within main train 7. This almost completely prevents wear as the result of any eccentricity that might occur as the result of manufacturing tolerances in spite of the alignment of central axis 18 with center line 19 by compensating for the eccentricity.

The transmitting surfaces 27 of coupling elements 22 and 26 are hardened to minimize wear on them and make it possible to transmit more powerful forces.

The distance A between the outer faces of the two cams 24, which are symmetrical, is more than half the diameter D of output gearwheel 9 to minimize the effects of the relative motion of cams 24 and channels 25.

Angular gears 3 can be dismounted with the coupling device very easily without having to disassemble main train 7 because the distance A between the outer faces of the two cams 24 is shorter than the diameter d of the mount 15 for guides 17.

It will be appreciated that the instant specification and claims are set forth by way of illustration and not limitation, and that various modifications and changes may be made without departing from the spirit and scope of the present invention.

What is claimed is:

1. In an agricultural machine having a frame on which tool rotors are mounted in a row on upright shafts extending across the direction of travel, said rotors being driven by a horizontal driveshaft that is segmented and interlocked by couplings, wherein each segment of the driveshaft is a component of one of a plurality of angular gears that drive the tool rotors, a main train having a housing mounted on the frame and an output gearwheel mounted in the housing by bearings, the horizontal driveshaft being coupled through coupling means inside the housing of the main train with the output gearwheel of the main train, said coupling means forming said couplings, said driveshaft being driven by said output gearwheel, the improvement comprising: guide means for aligning the central axis of the driveshaft components with the center line of the output gearwheel of the main train, the guide means disposed at least between the main train and the angular gears of the tool rotors that are immediately adjacent to it and wherein the coupling means comprises coupling elements in the output gear wheel and a coupling component rigidly attached to the driveshaft components extending into the main train, said coupling component including other coupling elements engaging the coupling elements in the output gearwheel with play inside the output gearwheel bearings.

2. The agricultural machine as in claim 1, wherein the coupling elements on the driveshaft coupling component comprise two cams and the coupling elements in the output gearwheel comprise two channels.

3. The agricultural machine as in claim 2, wherein the transmitting surfaces of the coupling elements are hardened.

4. The agricultural machine as in claim 2, wherein the two cams are symmetrical and the distance between the outer faces of the two cams is more than half the diameter of the output gearwheel.

5. The agricultural machine as in claim 4, wherein the guide means includes a ring mount and the distance between the outer faces of the two cams is shorter than the diameter of the ring mount.

6. The agricultural machine as in claim 1, wherein the transmitting surfaces of the coupling elements are hardened.

* * * * *